US009677257B2

(12) United States Patent
Andersen et al.

(10) Patent No.: US 9,677,257 B2
(45) Date of Patent: Jun. 13, 2017

(54) HANDSHOWER SLIDE MECHANISM

(71) Applicant: Kohler Co., Kohler, WI (US)

(72) Inventors: Terrence J. Andersen, Kohler, WI (US); William C. McKeone, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/291,623

(22) Filed: Oct. 12, 2016

(65) Prior Publication Data
US 2017/0030057 A1 Feb. 2, 2017

Related U.S. Application Data

(63) Continuation of application No. 15/199,406, filed on Jun. 30, 2016, now Pat. No. 9,587,385, which is a continuation of application No. 14/181,180, filed on Feb. 14, 2014, now Pat. No. 9,382,699.

(51) Int. Cl.
*A47K 3/00* (2006.01)
*E03C 1/06* (2006.01)
*F16B 2/18* (2006.01)

(52) U.S. Cl.
CPC .............. *E03C 1/066* (2013.01); *F16B 2/18* (2013.01); *F16B 2/185* (2013.01)

(58) Field of Classification Search
CPC .......... E03C 1/06; E03C 1/0408; E03C 1/066; E03C 1/046; E03C 1/0404; E03C 2201/30; E03C 1/0409; E03C 1/00; E03C 1/04; E03C 1/042; E03C 2001/0415; E03C 1/055; E03C 1/021; E03C 1/023; E03C 1/05

USPC ... 248/295.11, 296.1, 297.21, 288.11, 291.1, 248/292.13; 4/567, 596, 601, 615
See application file for complete search history.

(56) References Cited

U.S. PATENT DOCUMENTS

| 5,481,765 | A | 1/1996 | Wang |
| 5,632,049 | A | 5/1997 | Chen |
| 5,749,552 | A | 5/1998 | Fan |
| 5,833,192 | A | 11/1998 | Buhrman |
| 5,855,348 | A | 1/1999 | Fornara |
| 6,276,003 | B1 | 8/2001 | Knapp |
| 6,453,486 | B1 | 9/2002 | Chen |
| 6,473,916 | B2 | 11/2002 | Schiødt |
| 6,626,378 | B2 | 9/2003 | Sasaki et al. |
| 6,802,089 | B2 | 10/2004 | Cropelli |
| 7,043,776 | B1 * | 5/2006 | Wu ........................ E03C 1/0408 4/601 |
| 7,197,776 | B2 | 4/2007 | Tsai |

(Continued)

*Primary Examiner* — Steven Marsh
(74) *Attorney, Agent, or Firm* — Foley & Lardner LLP

(57) ABSTRACT

A handshower slide includes a bar with a passageway, a slide mechanism positioned along a length of the bar, and a showerhead holder movable with the slide mechanism along the length of the bar. The slide mechanism includes a handle and a cam, and the cam is positioned within the passageway and is rotatable between a first orientation and a second orientation relative to the bar. The slide mechanism is not movable along the length of the bar while the cam is in the first orientation and is movable along the length of the bar while the cam is in the second orientation. An orientation of the cam is correlated to a position of the handle, and a spring is coupled to the handle and the cam, so that the spring biases the cam toward the first orientation and away from the second orientation.

21 Claims, 18 Drawing Sheets

(56) References Cited

U.S. PATENT DOCUMENTS

| | | |
|---|---|---|
| 7,407,140 B2 | 8/2008 | Sen |
| 7,458,112 B1 | 12/2008 | Yang |
| 7,721,363 B2 | 5/2010 | Huang |
| D622,829 S | 8/2010 | Barnard |
| 7,766,291 B2 | 8/2010 | Eilmus et al. |
| 8,347,425 B2 * | 1/2013 | Bronstein ............... E03C 1/063 4/605 |
| 8,448,270 B2 | 5/2013 | Yang |
| 8,919,709 B2 | 12/2014 | Zhou |
| 2004/0172748 A1 * | 9/2004 | Faisst ................ A47K 3/281 4/570 |
| 2007/0245483 A1 * | 10/2007 | Eilmus ................ E03C 1/06 4/567 |
| 2009/0222983 A1 | 9/2009 | Bosio |
| 2009/0265848 A1 | 10/2009 | Tsai |
| 2011/0179566 A1 * | 7/2011 | Yang ................ E03C 1/066 4/605 |

* cited by examiner

HANDSHOWER SLIDE MECHANISM

CROSS REFERENCE TO RELATED APPLICATIONS

This application claims the benefit as a continuation of U.S. patent application Ser. No. 15/199,406 filed on Jun. 30, 2016, which is a continuation of U.S. patent application Ser. No. 14/181,180 filed on Feb. 14, 2014, both of which are hereby incorporated by reference in their entirety.

BACKGROUND

The present application relates generally to the field of adjustable shower or handshower holders. The showerhead may be located on a slidebar (either directly or indirectly within a showerhead holder attached to the slidebar). The showerhead may be moved along the slidebar to allow the user to adjust the vertical position of the showerhead. The angle of the showerhead (or the showerhead holder) may also be adjusted or tilted according to the user's preference.

Typically, the showerhead holder grips around the outside of the slidebar with a squeezing, tightening, or clamping force/mechanism. All of the force is exerted from the outside of the slidebar. For example, a rubber or plastic pad with a metal backing plate or plastic squeezing collar may be used to grip the outside of the slidebar. The clamping force may be controlled with a handle correlated to a compression spring or interior threads.

However, if the handle is released or dropped before the backing plate or squeezing collar is fully engaged or locked with the slidebar or locked into position, the showerhead holder may freefall along the slidebar, potentially resulting in damage to the product or injury to the user, particularly if the handshower and holder are heavy.

SUMMARY

One embodiment relates to a handshower slide, the handshower slide comprising a bar with a passageway and a slide mechanism positioned along a length of the bar. The slide mechanism comprises a handle, a cam, and a shower holder. The cam is positioned within the passageway and is rotatable between a first orientation and a second orientation relative to the bar. The slide mechanism is secured along the length of the bar while the cam is in the first orientation and movable along the length of the bar while the cam is in the second orientation. An orientation of the cam is controlled by a spring and is biased toward the first orientation and the handle is coupled the slide mechanism through the spring and an orientation of the cam is correlated to a position of the handle. The cam is configured to be movable from the first orientation to the second orientation by an external force on the handle that overcomes the force of the spring and frictionally engages the cam with the bar.

Another embodiment relates to an adjustable holding mechanism comprising a bar having an elongated opening leading to an internal passage, a cam disposed within the internal passage and rotatable between a first position, a handle coupled to the cam through the elongated opening, and a spring coupled to the handle and a movable body of the holding mechanism. The cam is frictionally engaged with the bar and a second position where the cam is movable along the internal passage. The spring is configured to bias the handle and the cam toward the first position.

Another embodiment relates to an adjustable handshower slide comprising a bar with an interior passageway accessible through an elongated opening, a cam movable along a length of the passageway and at least partially covered by a gripping material, a handle coupled to the cam through the elongated opening, wherein a position of the cam is directly correlated to an orientation of the handle, and a movable base including a shower holder. The cam is rotatable between a first position where the cam is not movable within the passageway and a second position where the cam is movable along the passageway. The handle is rotatably attached to the base with a spring and the spring is biased to move the handle and the cam to the first position.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Referring generally to the figures, disclosed herein is a showerhead slide, as shown according to exemplary embodiments, that may be used to hold a showerhead and allow the position and angle of the showerhead to be adjusted and automatically or manually locked into position. The showerhead slide and methods described herein may be used in a variety of non-shower related applications, wherein it would be desirable to adjustably hold and automatically lock one member relative to another. In one exemplary embodiment of the present invention, the showerhead slide is utilized as a handshower slide to hold a handshower, to allow the vertical position and angle of the handshower to be adjustable, as well as to automatically secure the handshower into the desired position.

More specifically, the handshower slide provides a handshower holder that is movable and securable along an inner passage or elongated opening of a shaft or bar. The handshower holder is attached to a cam within the passage and the cam exerts a force along the inside of the bar in a first locked position or orientation to secure the handshower holder along the bar. In order to move the handshower holder along the bar, the cam may be moved to a second moveable, unlocked position or orientation by rotating a handle. Turning or rotating the handle also rotates the cam into the second unlocked position, which reduces or eliminates the force exerted along the passage and allows the handshower holder to be moved. Once the handle is released, the cam will automatically rotate back to the first locked position due to an internal spring, such as a torsion spring. Therefore, even if the handshower holder is not actively or manually locked along the bar, the handshower holder will not freefall along the bar due to the automatic locking mechanism.

Figure 1:
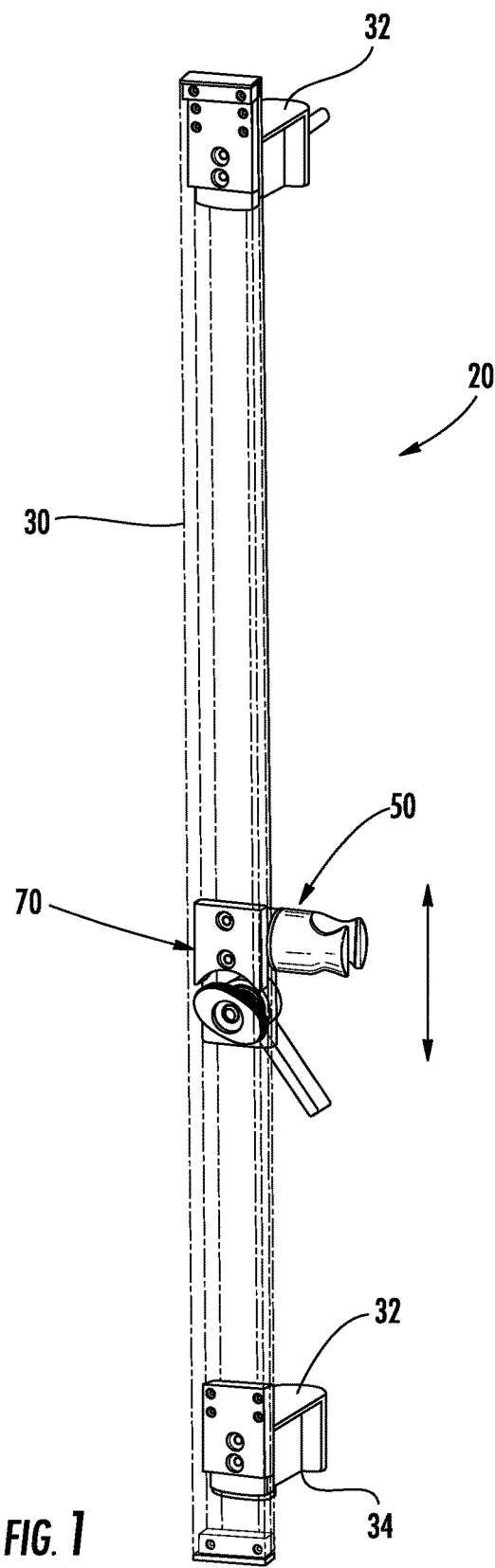
FIG. 1 is a partial breakaway, perspective front view of a handshower slide according to one embodiment of the present invention.

FIG. 1 illustrates an exemplary embodiment of a handshower slide 20 that is shown to include a bar 30, a handshower holder 50, and a slide mechanism 70, according to the present invention. The handshower holder 50 may be used to removably or permanently secure a shower head, such as a handshower head (not shown), along the bar 30. The slide mechanism 70 may be used to move and secure the handshower holder 50 along the bar 30. When no external force is being applied to move the slide mechanism 70, the slide mechanism 70 will automatically lock to the bar 30. Although a handshower holder 50 is shown in FIG. 1, the handshower slide 20 may be used with a variety of applications in which one mechanism is movably secured with respect to a stationary piece. However, the handshower slide 20 is particularly useful with any type of showerhead or showerhead holder.

As shown in FIG. 1, according to the desired positioning, the handshower holder 50 may be moved and secured along the length of the bar 30 by utilizing the slide mechanism 70 (as discussed later). The bar 30 may be oriented according to any desired configuration. For example, the bar 30 may be vertical (as shown), horizontal, or at any angle there between. Further, the bar 30 may be straight or curved. As shown in FIG. 1, the vertical bar 30 may allow the height of the handshower holder 50 (and therefore the showerhead) to be adjusted according to the desired height. For example, the handshower holder 50 may be lowered for ease of use for seated users or shorter users, such as children.

Although a handshower holder 50 is shown, it is anticipated that a showerhead or a showerhead holder may be used with the handshower slide 20. The handshower holder 50 may allow the showerhead to be removed from the wall or bar 30 and allows the user to hold the handshower.

The bar 30 may be any shape or size, according to the desired configuration. For example, the bar 30 may have a cross-sectional shape that is rectangular (as shown), oval, circular, round, elliptical, or another suitable shape. The other components of the handshower slide 20, such as the slide mechanism 70, may be shaped and sized accordingly. The bar 30 may be at least partially hollow, in that the bar 30 may provide an open and inner or interior channel, region, slot, shaft, passage, or passageway 36 along the length of the bar 30 to allow an internal mechanism, such as the slide mechanism 70, move along and at least partially within. The slide mechanism 70 may, therefore, be at least partially concealed within the bar 30, hiding unsightly mechanisms within the bar 30. The bar 30 may further include an elongated opening communicating with the passageway 36 to provide at least partial access to the inner passageway along at least a length of the bar 30 (e.g. the bar 30 may not be completely enclosed along the hollow region). The slide mechanism 70 may access the inner passageway through the elongated opening. The elongated opening may be positioned on any side (or multiple sides) of the bar 30 (e.g. front, back, and/or side).

The bar 30 may be secured to a wall (e.g. a shower wall) through a variety of different mechanisms. For example, one or more wall posts 32 may be used along any portion of the bar 30. The wall posts 32 may be attached to the bar 30 and a wall through a variety of different mechanisms and configurations, including screws, clips, tape, glue, or welding.

At least one wall post 32 may include an integral water supply 34 to provide or supply water to the handshower head. The water supply 34 may be, for example, a bar or hose. For example, the water supply 34 may be formed integrally within the wall post 32 or the water supply 34 may be a separate piece from the wall post 32. The wall post 32 may include a hollow threaded end in which the water supply 34 may attach into or with.

Figure 2:
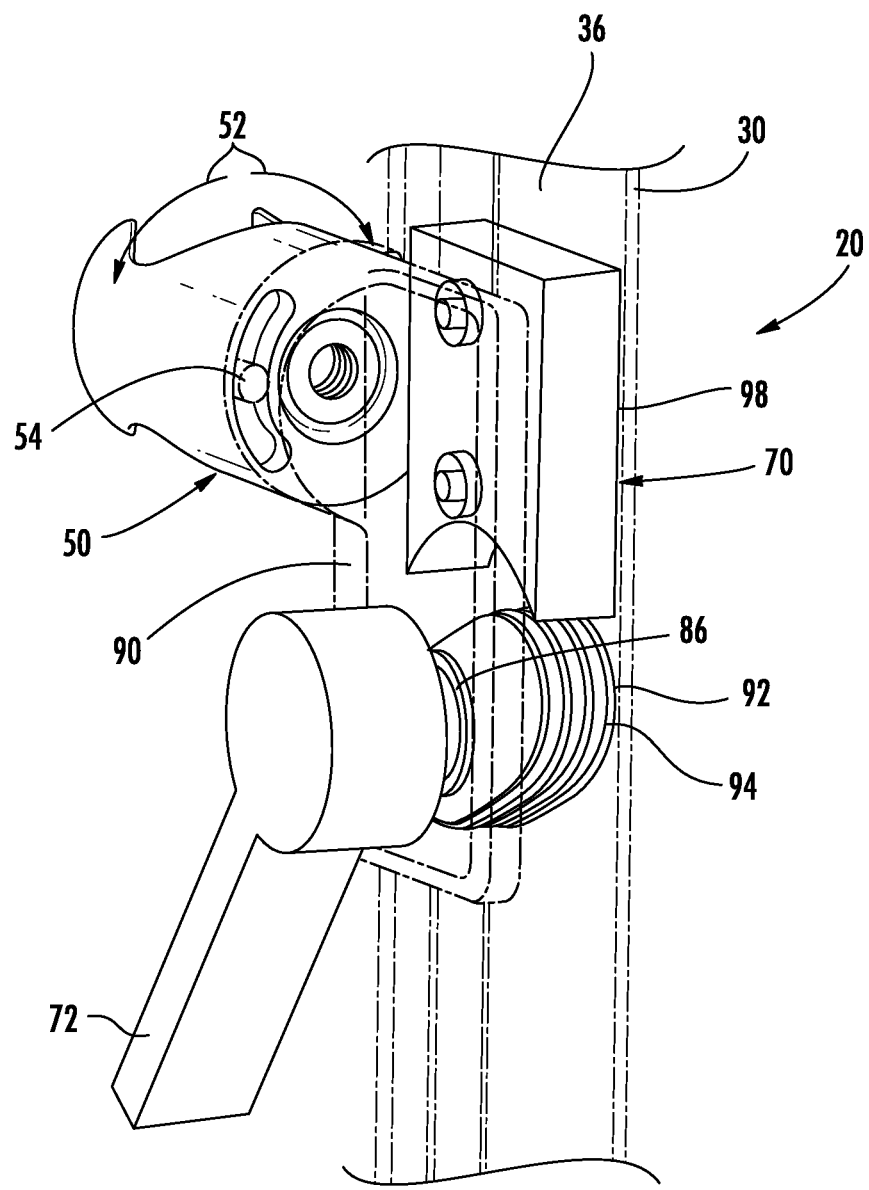
FIG. 2 is a partial breakaway, perspective back view of the handshower slide of FIG. 1 including a handshower holder, a slide mechanism, and a bar.
Figure 3:
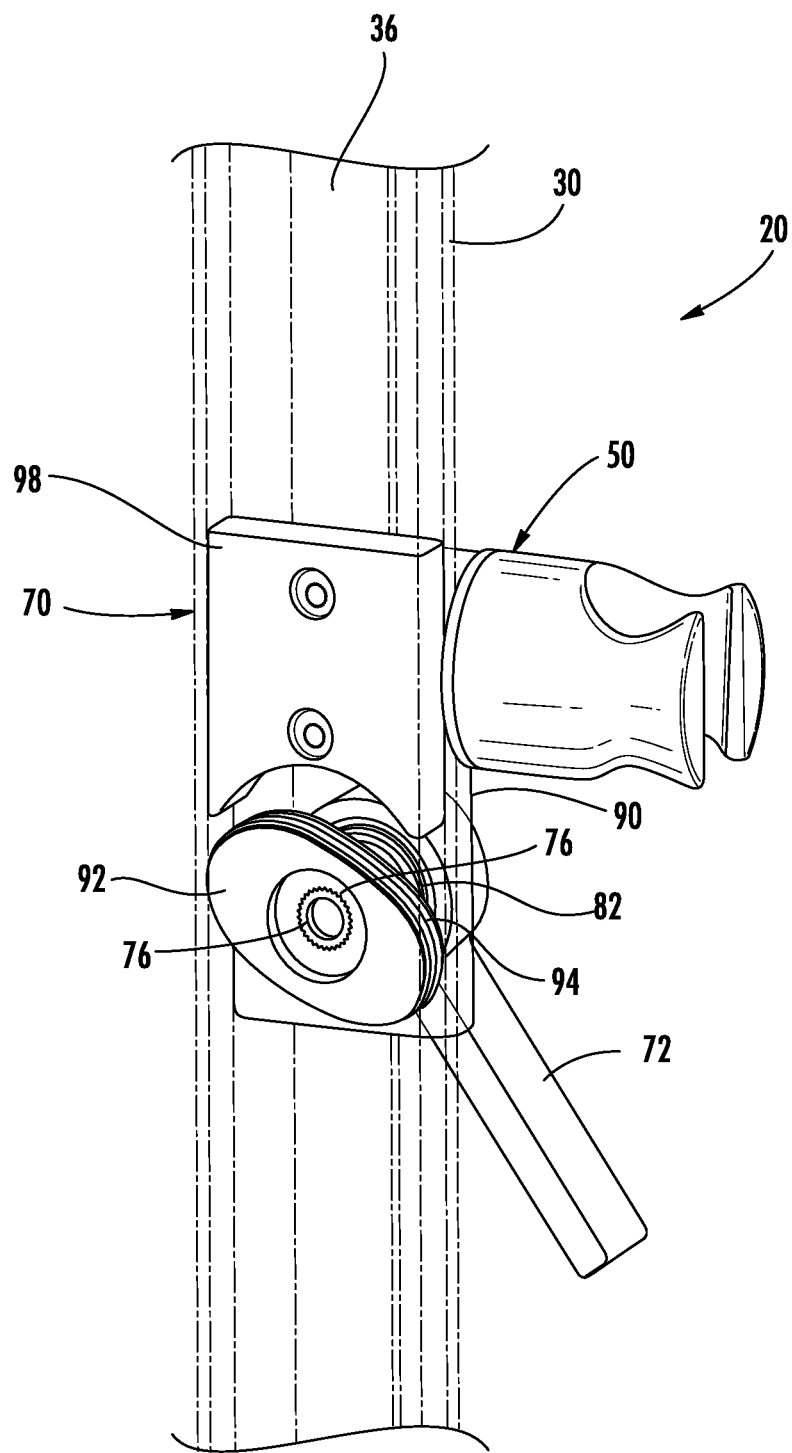
FIG. 3 is a partial breakaway, perspective front view of a handshower holder, a slide mechanism, and a bar that may be used with the handshower slide of FIG. 1.

FIGS. 2 and 3 illustrate one embodiment of the handshower slide 20 with the slide mechanism 70 and the handshower holder 50 movable and securable along the bar 30. The handshower holder 50 is connected to and supported by the slide mechanism 70. The handshower holder 50 is rotatably securable with respect to the slide mechanism 70, as indicated by arrows 52 and discussed in more detail later. The slide mechanism 70 is biased toward a secured or locked position when no external force is being exerted on the handle 72. The slide mechanism 70 is supported by the bar 30 and is at least partially located or concealed within the bar 30. The slide mechanism 70 may slide and be secured along at least a portion of the length of the bar 30, allowing the position of the handshower holder 50 to be adjusted relative to the bar 30.

Figure 4:
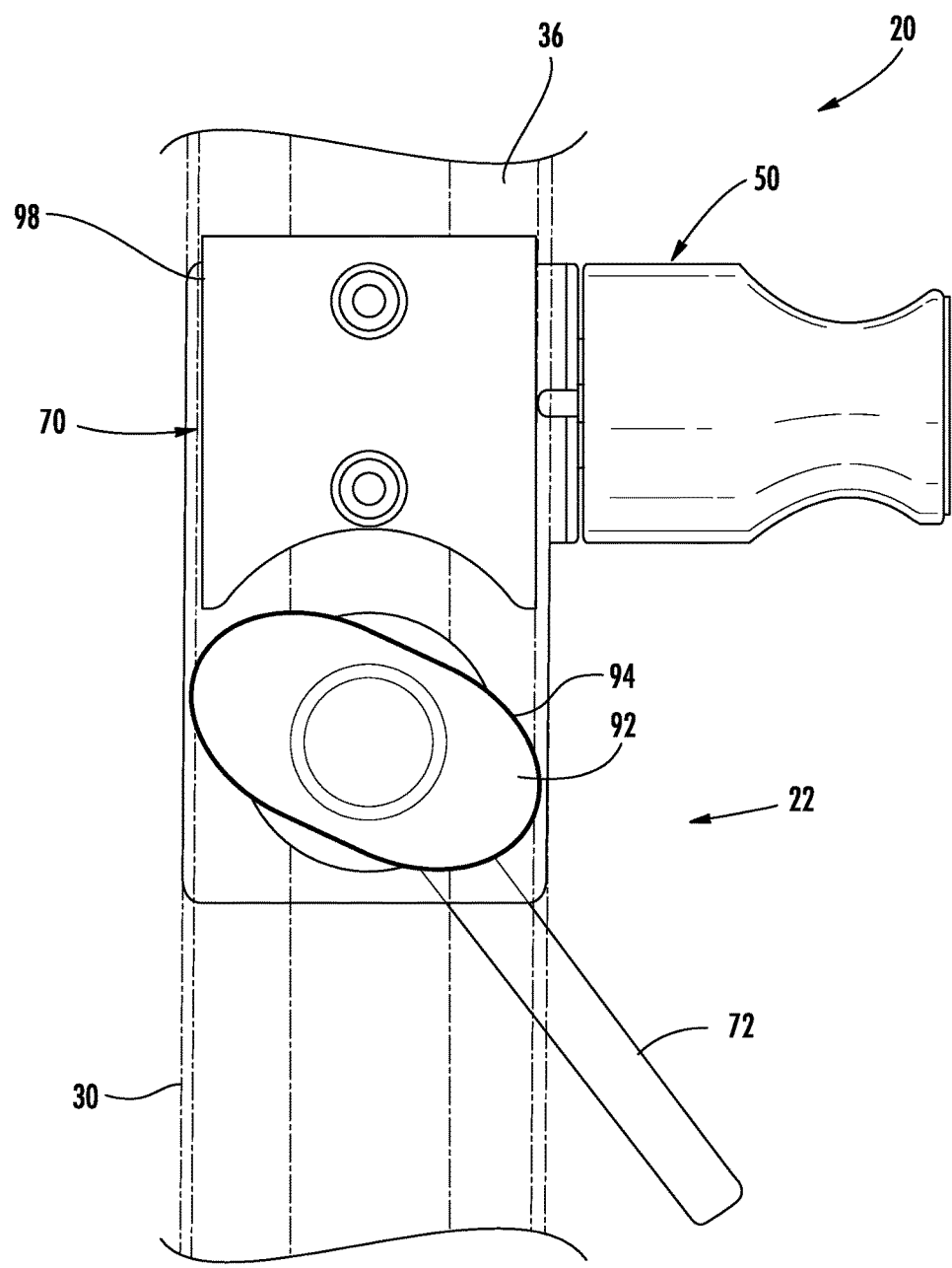
FIG. 4 is a partial breakaway, front view of the handshower slide of FIG. 1 in a locked position.
Figure 5:
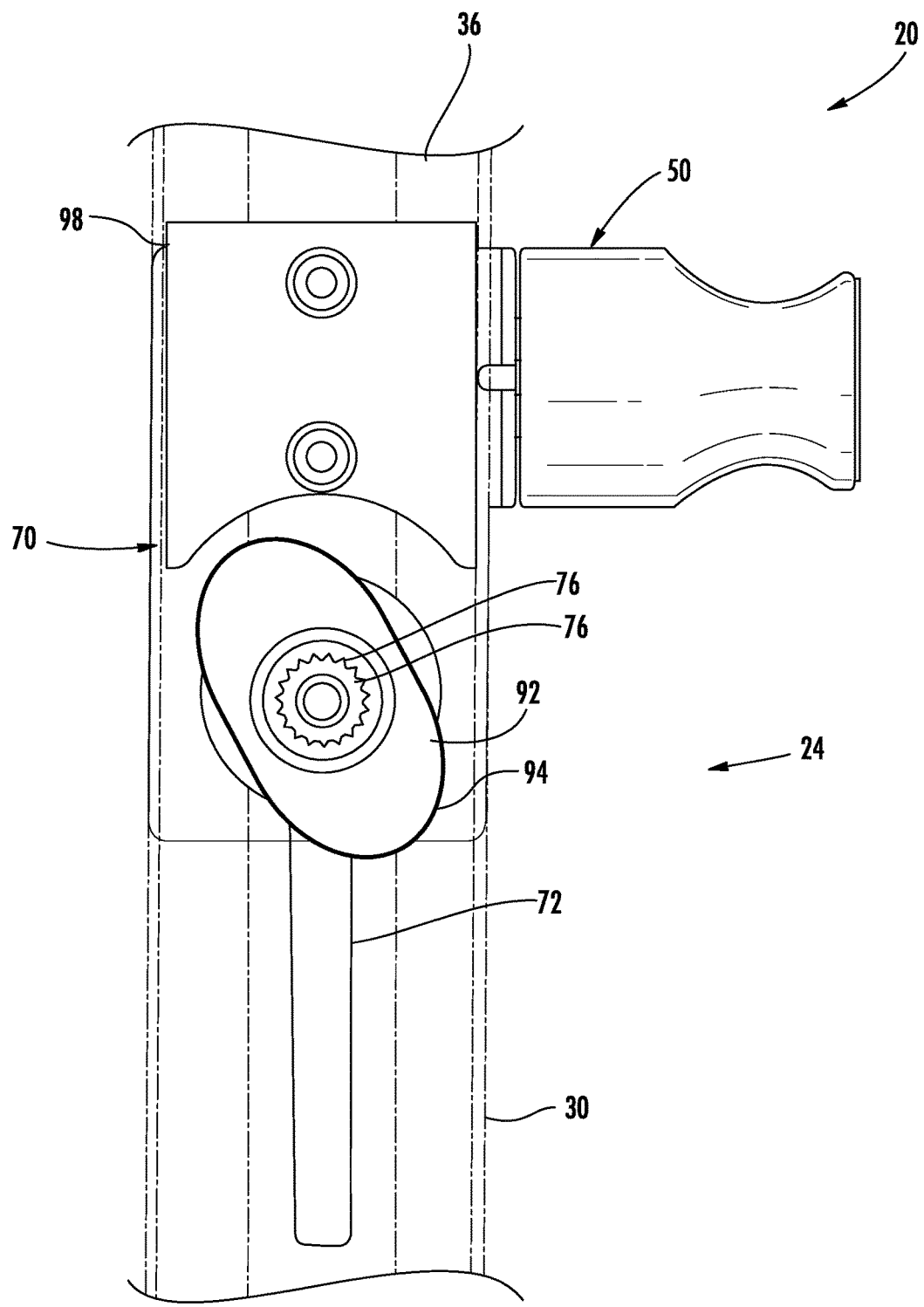
FIG. 5 is a partial breakaway, front view of the handshower slide of FIG. 1 in an unlocked position.

As shown in FIGS. 4 and 5, the slide mechanism 70 may move between at least two different positions, configurations, or orientations in order to either adjust the position of the slide mechanism 70 or to secure the slide mechanism 70 along the bar 30. FIG. 4 depicts the slide mechanism 70 in a secured or locked first position 22 in which the cam 92 of the slide mechanism 70 will be frictionally engaged with (e.g. wedged, lodged, etc. within) the bar 30 in order to stay in place along the bar 30. FIG. 5 depicts the slide mechanism 70 in a movable or unlocked second position 24 in which the cam 92 of the slide mechanism 70 may move or be moved along at least a length of the bar 30 to change the position of the slide mechanism and the handshower holder 50 relative to the bar 30.

By rotating a handle 72 (located at least partially outside of the bar 30), the slide mechanism 70 may be moved between the locked position 22 and the unlocked position 24. However, while there is no external force on the handle 72, the slide mechanism 70 will automatically move to the locked position 22. The handle 72 is directly or indirectly connected to a cam 92 (located at least partially within the bar 30), such that the orientation of the handle 72 (relative to the bar 30) directly affects the orientation of the cam 92. As the handle 72 is rotated, the cam 92 is also rotated within the bar 30. Due to the geometry of the cam 92, rotating the cam 92 either increases or decreases a force exerted by the cam 92 to the inside of the bar 30 (the passageway 36). As shown in FIGS. 4 and 5, the cam 92 has an oval shape. The cam 92 may be a variety of other shapes, including oblong, etc. Therefore, moving the handle 72 in a counter-clockwise direction presses the ends of the cam 92 outward against the inside of the bar 30 and prevents the slide mechanism 70 from moving. For example, FIG. 4 depicts the slide mechanism 70 in the locked position 22, with the handle 72 pointed at around 30° to the right and the cam 92 relatively more perpendicular or angled to the lengthwise direction of the passageway 36 of the bar 30 (or relatively more horizontal with respect to FIG. 4), increasing the force exerted by the cam 92 on the passageway 36 and securing the slide mechanism 70 along the length of the bar 30. The spring 82 may additionally generate a force to move the cam 92 further against the inside of the bar 30. More specifically, by moving the handle 72 toward the locked position 22, the spring tension is reduced as the force of the cam 92 on the passageway 36 increases to lock the slide mechanism 70 along the passageway 36. The cam 92, therefore, secures the slide mechanism 70 from within the bar 30.

Conversely, rotating the handle 72 in a clockwise direction moves the ends of the cam 92 away from the inside walls of the bar 30 and either partially or completely reduces the force exerted by the ends of the cam against the inside of the bar 30, thereby allowing the slide mechanism 70 to move freely along the length of the bar 30. For example, FIG. 5 depicts the slide mechanism 70 in the movable or unlocked position 24, with the handle 72 pointed or rotated downward and the cam 92 rotated away from or relatively more parallel to the lengthwise direction of the passageway 36 of the bar 30 (or relatively more vertical with respect to FIG. 5), reducing the force exerted by the cam 92 on the passageway 36 and allowing the slide mechanism 70 to move freely. In the unlocked position 24, the outside perimeter of the cam 92 either partially or completely disengages from the inside walls of the bar 30. For example, due to the rotation of the cam 92, there may be horizontal space or a gap between either side of the cam 92 and the inside wall of the bar 30 to allow the slide mechanism 70 to move freely in a vertical direction along the bar 30 (with respect to FIG. 5). Moving the handle 72 toward the unlocked position 24 increases the spring tension as the force of the cam 92 on the passageway 36 decreases to allow the slide mechanism 70 to move (thereby biasing the handle 72 to move the cam 92 into the locked position 22).

Figure 8:
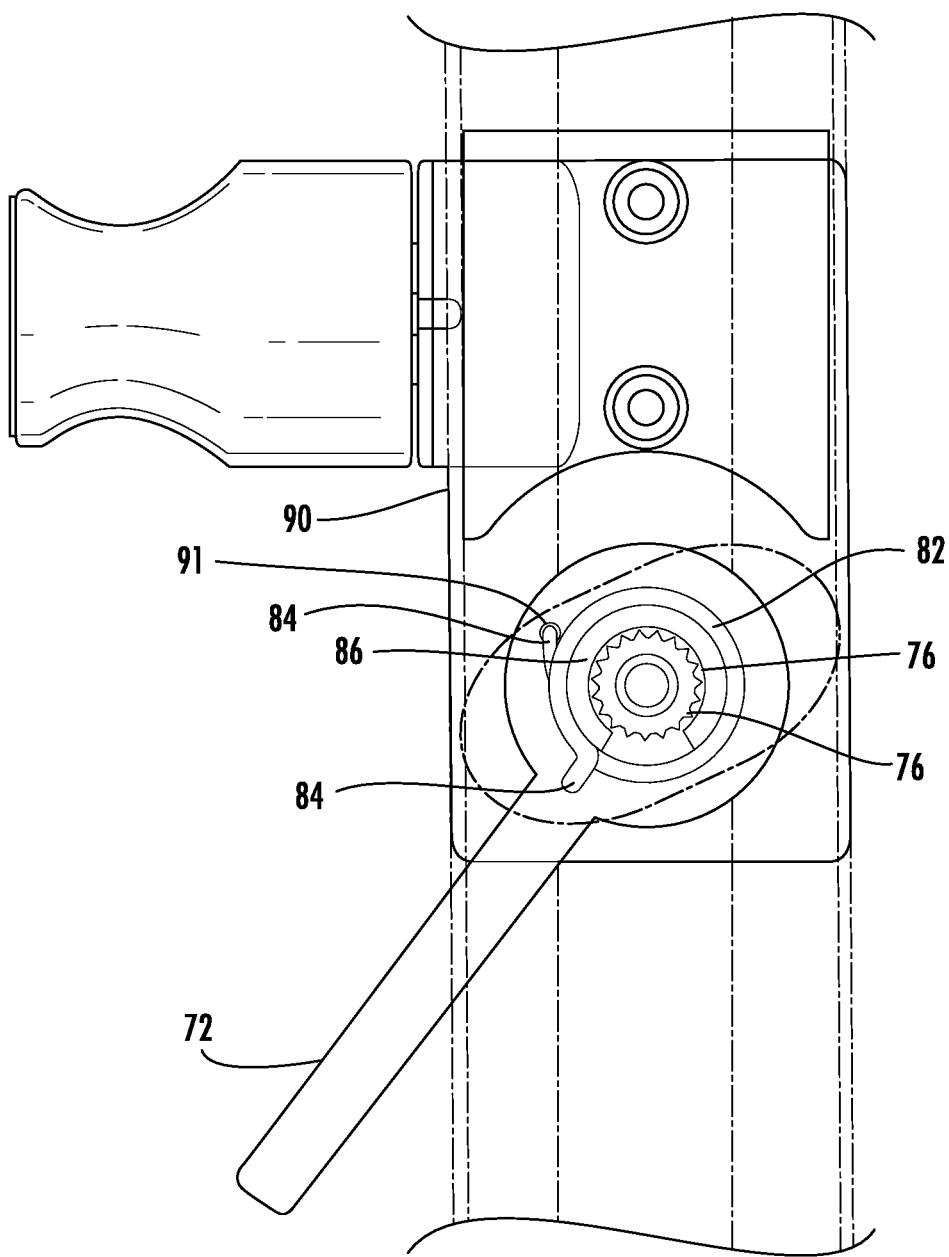
FIG. 8 partial breakaway, front view of the handshower slide of FIG. 1 in a locked position.

When there is no external force exerted on the handle 72 (e.g. when the user purposefully or accidentally releases the handle 72), the slide mechanism 70 is biased to move to the locked position 22 due to an internal spring 82, thus maintaining or holding the current position of the slide mechanism 70 and preventing the slide mechanism 70 from falling. As shown in FIGS. 6-10, the handle 72 and the base 90 may additionally be connected to the spring 82. The spring 82 may connect the handle 72 to a movable body or base 90 of the slide mechanism 70 and may hold the handle 72 in tension, such that the slide mechanism 70 is biased to be in or rotate back into the locked position 22. For example, as shown in FIG. 8, the spring 82 may connect the handle 72 and base 90 in such a way that the spring 82 preferably and automatically rotates the handle 72 (and therefore also the cam 92) into the locked position 22 (e.g. in a counter-clockwise direction with respect to FIGS. 4 and 5) in the absence of an external force. More specifically, the spring 82 may move to a lower energy state and lower the spring tension by moving the handle 72 to the locked position 22. Conversely, when the handle 72 is moved to the unlocked position 24, the spring 82 is in a higher energy state with a higher tension. The handle 72 may still be rotated in a clockwise direction, by a user for example, to unlock and move the slide mechanism 70. The force exerted by the user on the handle 72 may overcome the force exerted by the spring 82 to keep the slide mechanism 70 in the locked position 22, thereby moving the slide mechanism 70 into the unlocked position 24.

Therefore, if a user forgets to lock the slide mechanism 70 after adjusting the position along the bar 30 while in the unlocked position 24, the slide mechanism 70 with the handshower holder 50 will not freefall to the ground or to the bottom of the bar 30. Instead, due to the tension on the spring 82, the handle 72 (and cam 92) will automatically move or rotate into the locked position 22, thereby stopping the slide mechanism 70 from moving or sliding along the bar 30. The user may optionally move or rotate the handle 72 into the locked position 22 or further into a locked position 22 to firmly or manually secure the slide mechanism 70 along the bar 30, if desired (though the spring 82 may provide sufficient force to automatically and firmly secure or engage the slide mechanism 70 along the bar 30). Further, if any portion of the mechanism begins to fail (due, for example, to fatigue or slipperiness from soap, etc.), the user may firmly rotate (e.g. lift up on) the handle 72 to fully engage the slide mechanism 70 along the bar 30.

Figure 6:
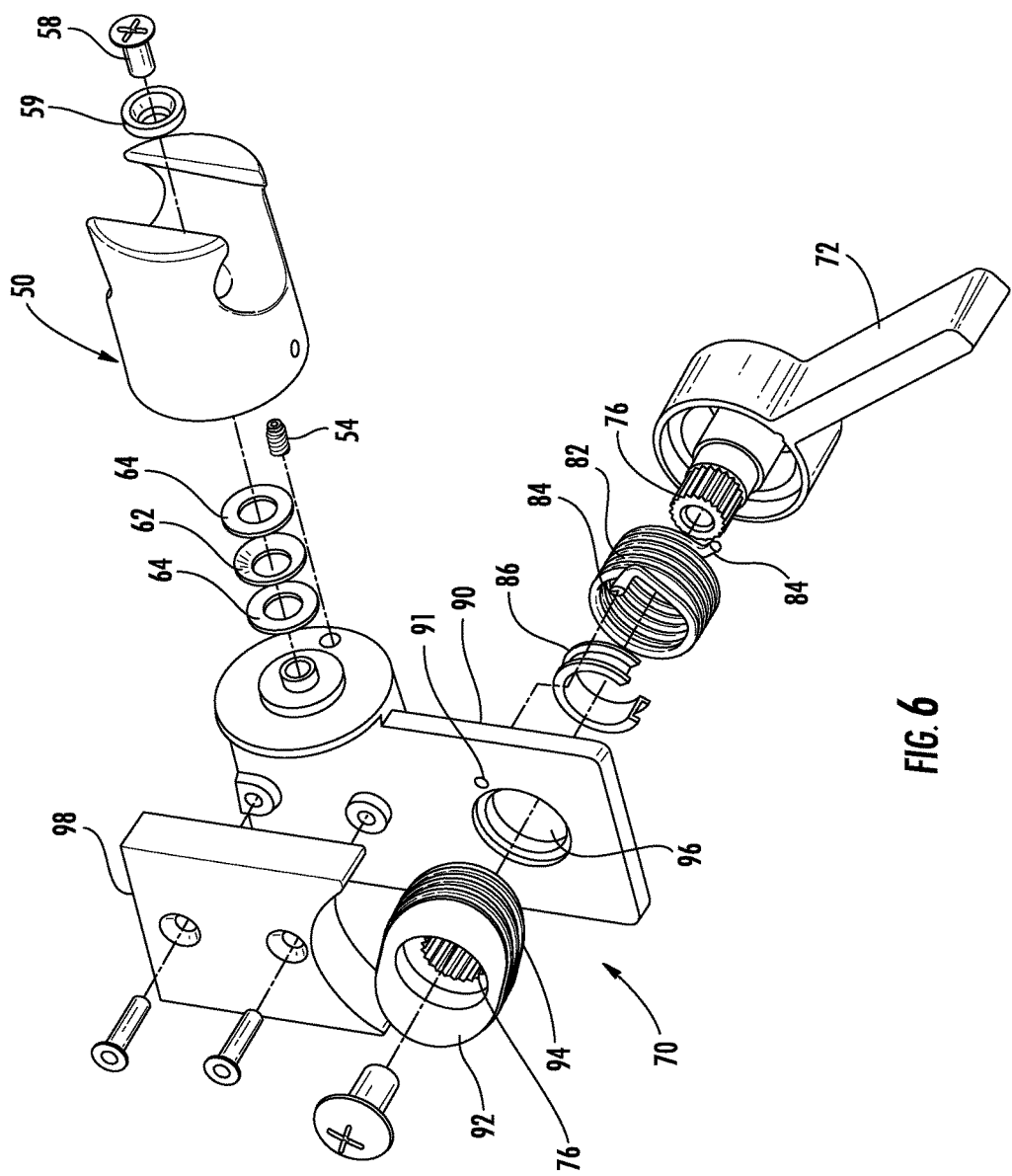
FIG. 6 is an exploded, perspective view of the handshower holder and slide mechanism of FIG. 2.
Figure 7:
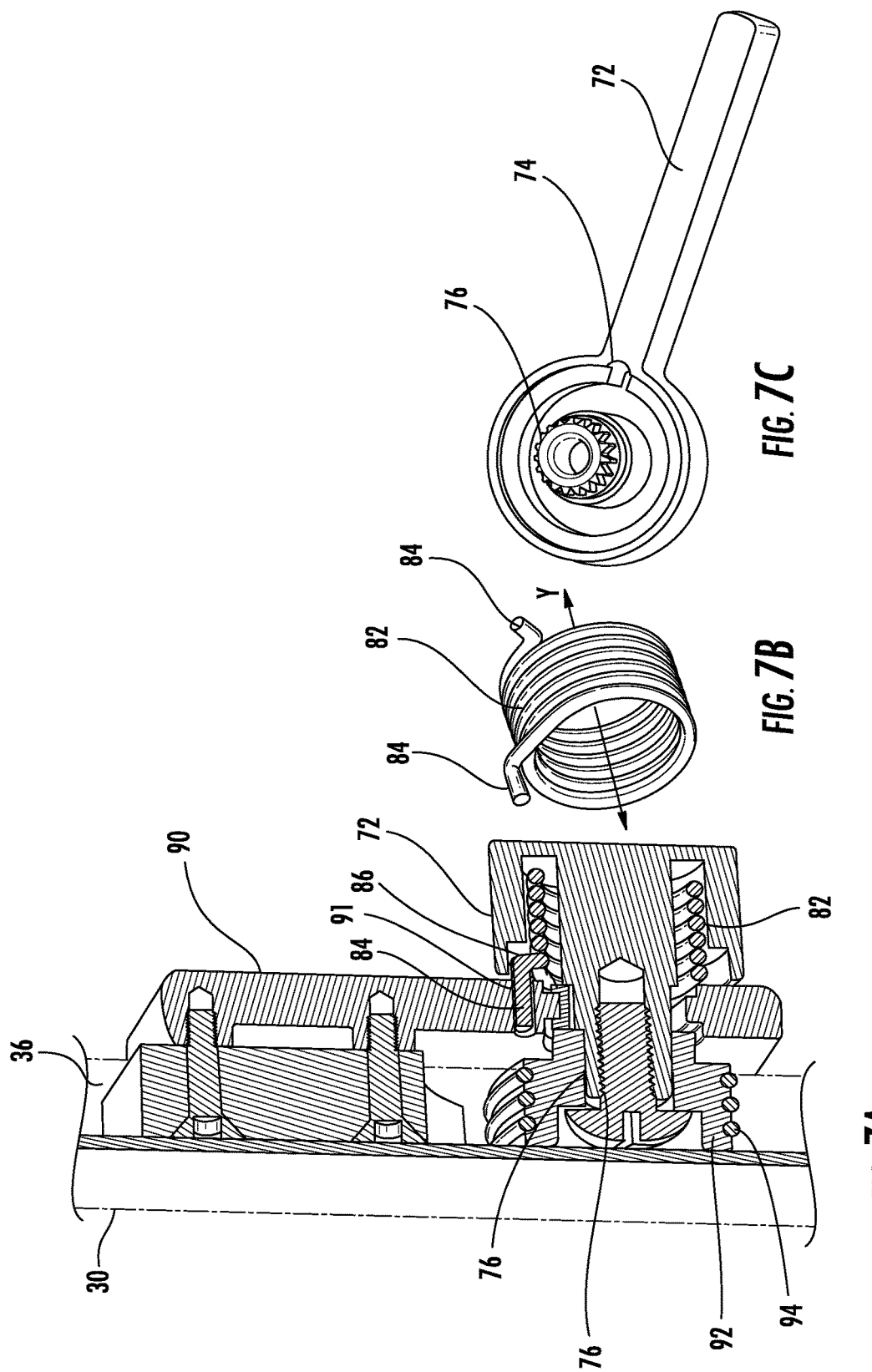
FIG. 7A is a cross-sectional, side view of the slide mechanism and bar of FIG. 1.
FIG. 7B is a perspective view of a spring that may be disposed within the slide mechanism of FIG. 7A.
FIG. 7C is a perspective view of a handle that may be disposed within the slide mechanism of FIG. 7A.

A variety of springs may be used within the slide mechanism 70. For example, a torsion spring may be used, as shown in FIG. 6. However, it is anticipated that other springs, such as compression, tension, or leaf springs, may be used. It is further anticipated that other mechanisms, such as magnets, may be used within the slide mechanism 70 in addition to or instead of the spring 82. Additionally, different types of torsion springs may be used. For example, the wire thickness, number and density of coils, and the spring diameter may be adjusted in order to achieve the desired size, strength, and pound force within the slide mechanism 70. It may be desired, for example, to use a spring with a max torque of approximately 7.8 in-lbs. in order to provide sufficient tension on the handle 72 without requiring too much force from the user to operate the slide mechanism 70. The spring 82 may be constructed out of a variety of materials, such as non-corrosive materials including but not limited to stainless steel or brass.

Figure 9:
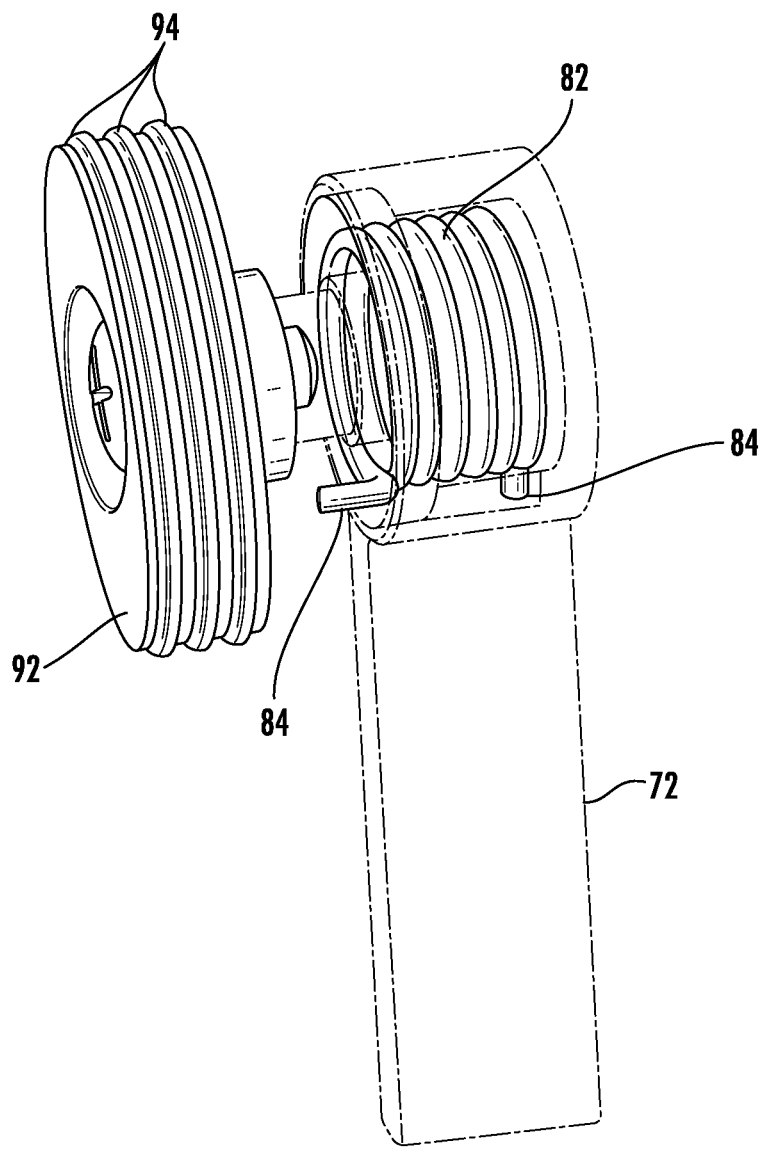
FIG. 9 is a partial breakaway, side view of the handle, a cam, and a spring that may be disposed in the handshower slide of FIG. 1.
Figure 10:
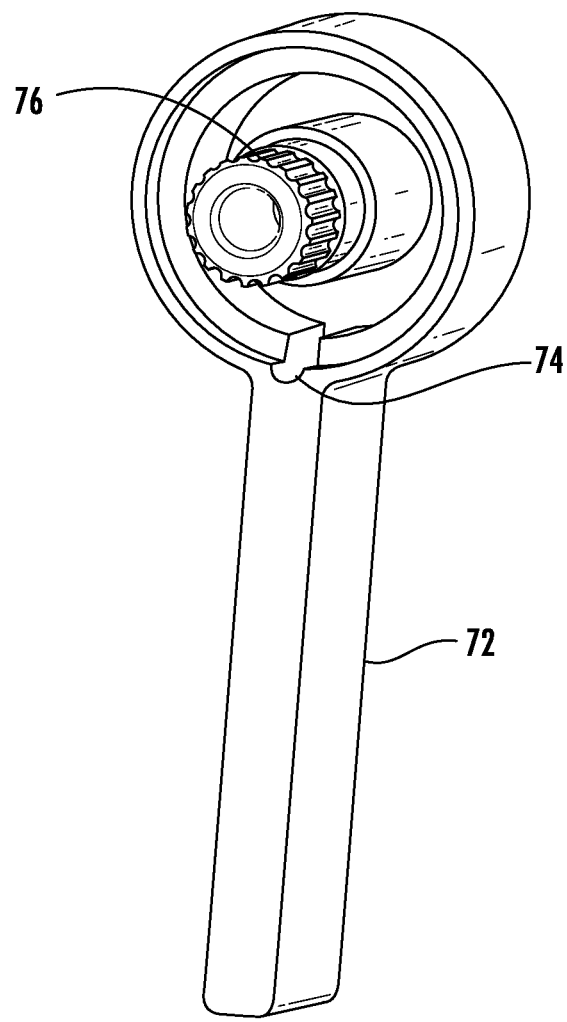
FIG. 10 is a perspective view of a handle that may be disposed within the handshower slide of FIG. 1.

As shown in FIG. 9, the spring 82 may be at least partially housed within and connect with the hub of the handle 72 and may include spring wings 84 at the ends of the spring 82. As shown in FIG. 10, the inside of the handle 72 may include a space or cavity to hold or house, as well as attach with (via the crevice 74) the spring 82. The height of the hub of the handle 72 may, therefore, be at least partially dependent on the length or height of the spring 82. The spring 82 may or may not directly connect with the cam 92. The spring wings 84 may be oriented in any position, orientation, and degrees of separation relative to each other and the spring 82, according to the desired configuration. For example, as shown in FIG. 7B, the spring wing 84 may be bent at approximately 90° away from the spring coil and the central or lengthwise axis Y of the spring 82 or bent at approximately 90° away from the spring coil and parallel to the lengthwise axis Y, according to the desired configuration. Further, the spring wings 84 may be separated by approximately 30-40° (as shown in FIG. 7B) or any other amount of radial separation. The length of the spring wings 84 may also be determined by the desired configuration.

The spring wings 84 may allow the spring 82 to attach to the handle 72 and the base 90. For example, the spring 82 may latch or lock into a keyway groove, slot, channel, hole, or crevice 74 within the inside of the hub of the handle 72 (shown in FIGS. 7C, 9, and 10) and into a keyway groove, slot, channel, hole, or crevice 91 within the base 90 (shown in FIG. 7A). FIG. 8 depicts the spring wings 84 attached to the handle 72 and the base 90. Attaching the spring wings 84 to both the handle 72 and the base 90 may hold the spring 82 in coil tension in order to bias the slide mechanism 70 to the locked position 22. As the spring 82 works to reduce the coil tension to go to a lower energy state, the handle 72 (and the cam 92) is rotated toward the locked position 22 and the cam 92 is pressed against the inside of the bar 30.

As shown in FIG. 6, the handshower slide 20 may include the handshower holder 50 and the slide mechanism 70, each with corresponding attachments and components. The components of the handshower slide 20 may be made with a variety of materials. However, in one embodiment, the base 90, as well as the handle 72, the pin 54, the handshower holder 50, the slide mechanism 70, and the bar 30, may be constructed out of a metal, such as brass or zinc and further plated with a copper layer and/or a finish such as polished chrome, polished nickel, or bronze.

The slide mechanism 70, with the handshower holder 50, may be located on any side of the bar 30. For example, the slide mechanism 70 may directly correlate to the position of the elongated opening of the bar 30, may be on a different side from the elongated opening, or may be located on multiple sides of the bar 30. The elongated opening, the slide mechanism 70, and the handshower holder 50 may be located on the front, side, and/or back of the bar 30.

The handle 72 may be oriented and positioned anywhere relative to the bar 30 and the slide mechanism 70. For example, the handle 72 may be located on the front, back or side of the bar 30. In order to transition between the locked position 22 and the unlocked position 24, the handle 72 may be configured to rotate in either direction and number of degrees of rotation, according to the desired configuration and to be both accessible and intuitive for the user. For example, although the handle 72 is pointed downward in the unlocked position 24 (as shown in FIG. 5), the handle 72 may be configured to be in any radial direction or position, such as to the left at 90° in the unlocked position 24. Additionally, any type of handle or activation mechanism may be used, including but not limited to knobs, levers, or pull handles. As shown in FIG. 10, the handle 72 may include an inner cavity to hold or house the spring 82 and a channel or crevice 74 to lock with the spring 82. The teeth 76 may be used to connect or interlock with the cam 92.

The handle 72 may directly or indirectly connect with the cam 92. For example, the handle 72 and the cam 92 may interlock or index with each other to provide a secure connection between the handle 72 and the cam 92 and to effectively translate motion or rotation between the handle 72 and the cam 92. More specifically, the handle 72 and the cam 92 may interlock with toothed spline and broach connection or complementary teeth 76, as shown in FIGS. 3, 5, 6, 7A, 7C, and 8. As shown in FIGS. 6 and 9, the handle 72 and the cam 92 may attached directly. Additionally or alternatively, the handle 72 and the cam 92 may be attached by a screw. Alternatively, the cam 92 and the handle 72 may optionally be one continuous piece or include multiple other pieces.

The handle 72 and the cam 92 may connect through a body or base 90. For example, the base 90 may include a hole 96 for at least a portion of the handle 72 and/or the cam 92 to move through to interlock. The base 90 may move with the slide mechanism 70 along the bar 30 and may provide a surface or area for the various components of the handshower slide 20 to attach to or with. As shown in FIG. 6, the base 90 may provide a surface or carriage for the handshower holder 50 and the slide mechanism 70, and their corresponding various components, to attach to and move with. For example, the base 90 may include a hole 96 for the handle 72 and the cam 92 to fit within, a channel or crevice 91 for the spring to attach into, holes for screws to attach an inner slide 98 to the base 90, a hole for a screw to attach to the handshower holder, and a pin 54 to allow the handshower holder 50 to rotate (as discussed later). The base 90 may be at least partially located on the outside of the bar 30 and at least partially visible to the user.

In order to prevent metal-on-metal rubbing (e.g. rubbing or wearing from the handle 72 and/or cam 92 moving or rotating along the inside of the base 90) and provide smooth rotation between the handle 72 (and/or cam 92) and the base 90, a bearing 86 may be positioned within the hole 96 in the base 90, as shown in FIGS. 2, 6, 7A, and 8. The bearing 86 may be C-shaped in order to be compressed or squeezed to a smaller diameter to fit within the hole 96 and to expand outward once in place and maintain its position. The bearing 86 may include lips on either side extending beyond the diameter of the bearing 86 in order to maintain the position within the hole 96. The bearing 86 may be a variety of different materials, including but not limited to a plastic material, such as, for example, acetal.

The cam 92 may be shaped and sized to fit at least partially within the inside of the bar 30 in the passageway 36. The cam 92, as shown, is shaped as an oval in order to more effectively engage along the inside walls of the bar 30 when the slide mechanism 70 is in the locked position 22 and to avoid contact along the inside walls while the slide mechanism 70 is in the unlocked position 24 (thereby providing a smoother feel and reducing the friction or the necessary applied force by the user in order to move the slide mechanism 70). The cam 92 may be constructed out of a variety of materials, including metal or a dense/hard plastic.

It is anticipated that a variety of different forces may be exerted along the inside of the bar 30 (e.g. the passageway 36) by the cam 92, including a frictional force or magnetic force, in order to hold the slide mechanism 70 in place while in the locked position 22. While in the locked position, the outside perimeter of the cam 92 or additional frictional components around the cam 92 (e.g. O-rings 94) are forced against the inside of the bar 30 or the passageway 36 to provide a locking force and to hold the slide mechanism 70 in position along the bar 30. This locking force may be further augmented with a spring 82, such as a torsion spring, as discussed later. The cam 92, itself, may be constructed out of a frictional material, such as rubber, in order to grip the inside of the bar 30.

Alternatively or additionally, components may be coupled with the cam 92 and/or bar 30 to help the cam 92 effectively grip the inside of the bar 30. For example, the cam 92 may include a frictional layer or component(s) along the outside perimeter to increase the friction between the cam 92 and the bar 30, such a rubber O-rings 94 or a rubber layer/coating. As shown in FIGS. 6 and 9 and for example, three O-rings 94 may be attached to the outside perimeter of the cam 92 to interact with, push against, and grip the inside of the bar 30 or the passageway 36. However, it is anticipated that any number, shape, and width of O-rings 94 may be used according to the desired configuration and to evenly distribute the force, to reduce fatigue, to reduce costs or mass, and/or to increase the amount of grip by increasing the surface area contact. For example, one larger O-ring 94 may be surrounded by two smaller O-rings 94. Alternatively or additionally, the bar 30 may include a frictional layer, coating, or component(s). The O-rings 94, or other frictional components, may be made out of variety of frictional or gripping materials, such as rubber. With the additional gripping components (e.g. the O-rings 94), the cam 92 may be constructed out of hard plastic.

Figure 11:
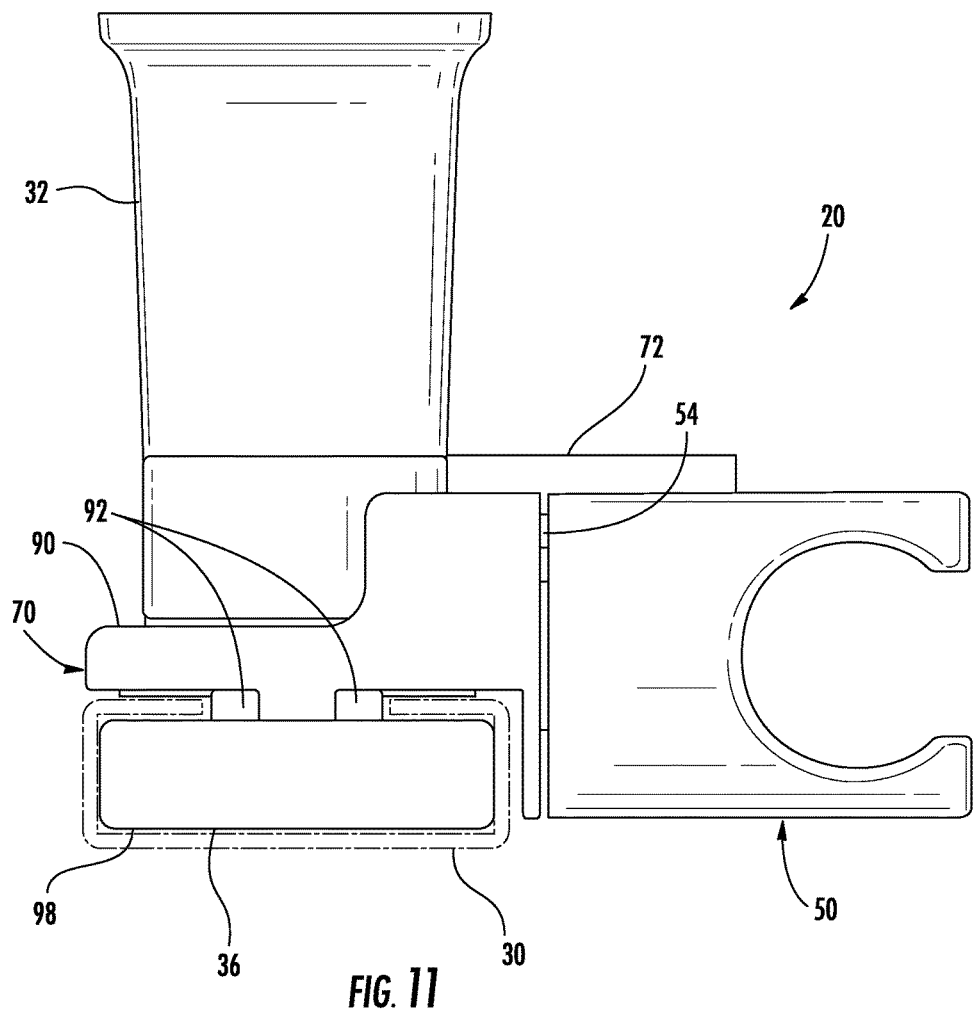
FIG. 11 is a cross-sectional top view of the handshower slide of FIG. 1.

The slide mechanism 70 may further include an inner slide 98 that may move at least partially within the passageway 36 of the bar 30, as shown in FIGS. 3 and 11. The inner slide 98 may anchor the slide mechanism 70 inside the bar 30 and provide stability and smooth movement and feel for the slide mechanism 70 as the slide mechanism 70 is moved along the bar 30. For example, the inner slide 98 may keep the slide mechanism 70 in line with the passageway 36 and prevent the slide mechanism 70 from wobbling or rocking in any direction with respect to the bar 30. The inner slide 98 may be located with or near the cam 92 at least partially within the bar 30. The inner slide 98 may optionally be integral or one-piece with the base 90 or may be a separate piece and attached through a variety of different mechanisms, such as screws (as shown in FIG. 6). The inner slide 98 may be constructed out of a variety of materials, including but not limited to metal or rigid, hard plastic.

Figure 15:
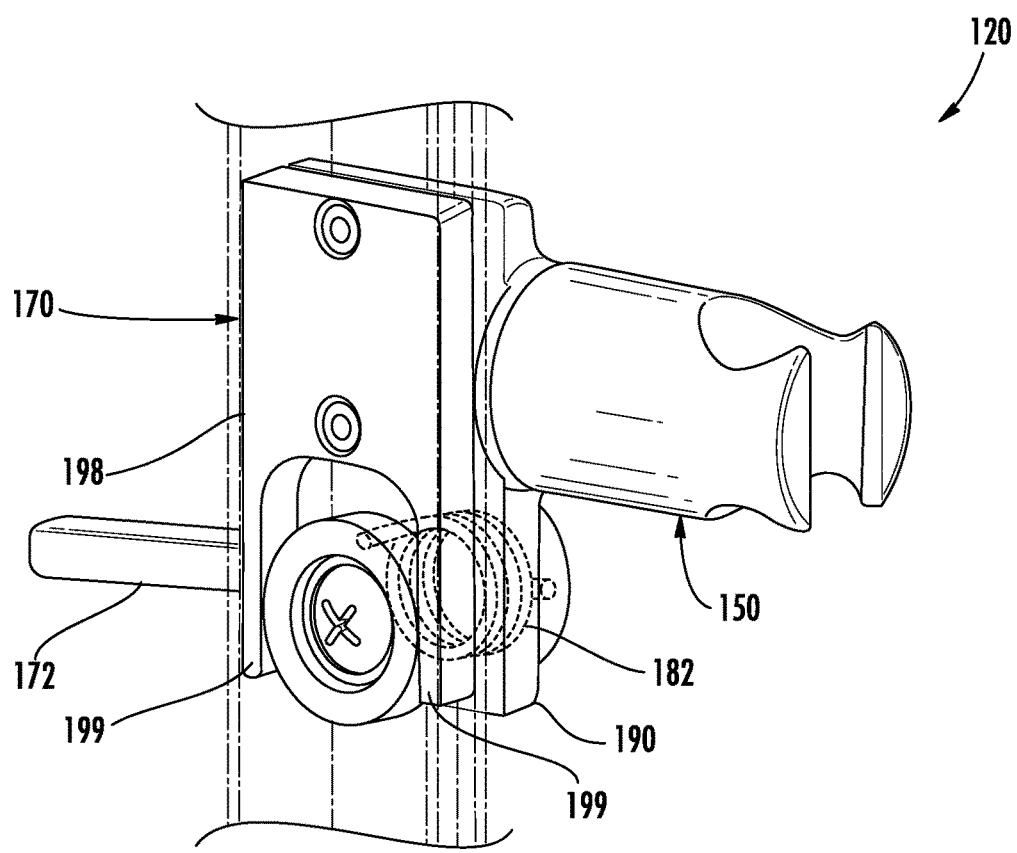
FIG. 15 is a perspective front view of the handshower slide of FIG. 14.
Figure 16:
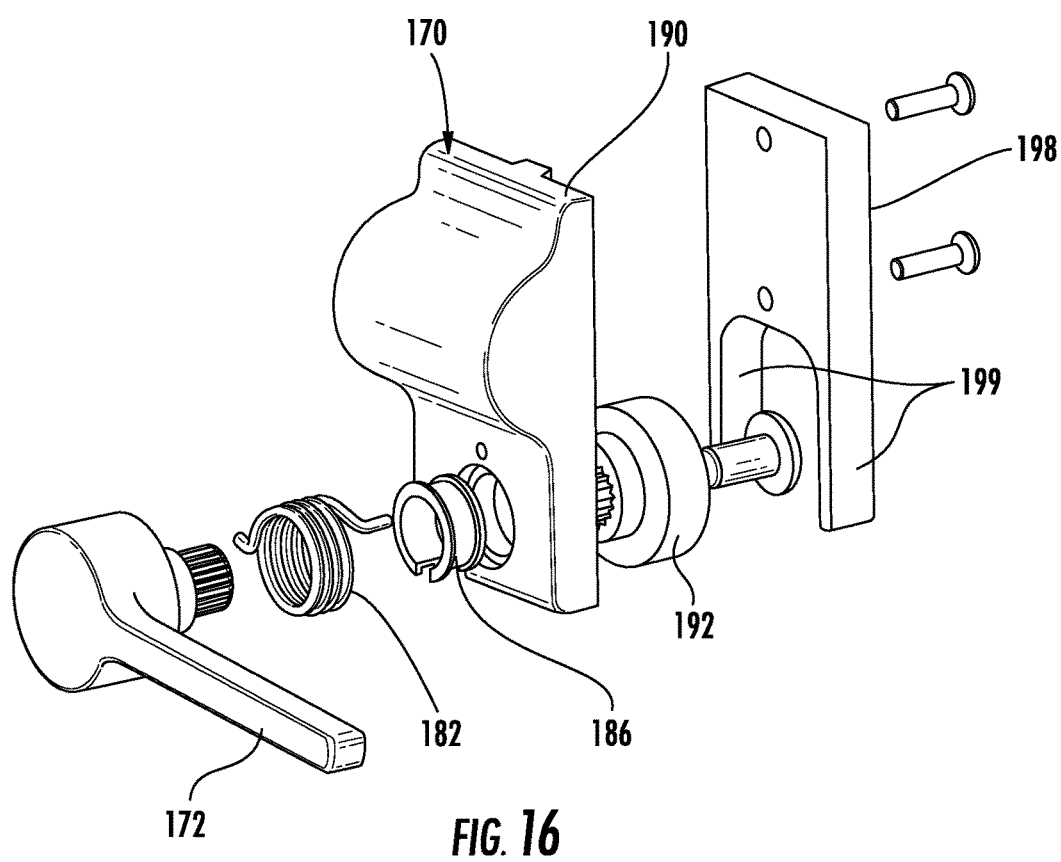
FIG. 16 is an exploded, perspective view of a slide mechanism that may be disposed within the handshower slide of FIG. 14.

The inner slide 98 may be long enough in order to provide stability, but short enough to not limit the amount of potential travel for the slide mechanism 70 along the bar 30. As shown in FIGS. 5 and 6, the inner slide 98 may include an arc at the lower end of the inner slide 98 in order to provide clearance room for the cam 92 to rotate, while still providing stability along at least a portion of the length of the slide mechanism 70. By providing sufficient clearance room for the cam 92, the cam 92 may directly engage with the bar 30, thereby requiring less force to engage or disengage the cam 92 and the passageway 36 and less force to be exerted by the user on the end of the handle 72 to operate the slide mechanism 70. For example, in one embodiment, five pounds of force or less may be required to operate the handle 72. Alternatively, the inner slide 98 may include wings 199, as shown in FIGS. 15 and 16. The cam 92 may, for example, push out on the wings 199 in order to engage and lock the slide mechanism 70 with the passageway 36.

Figure 12:
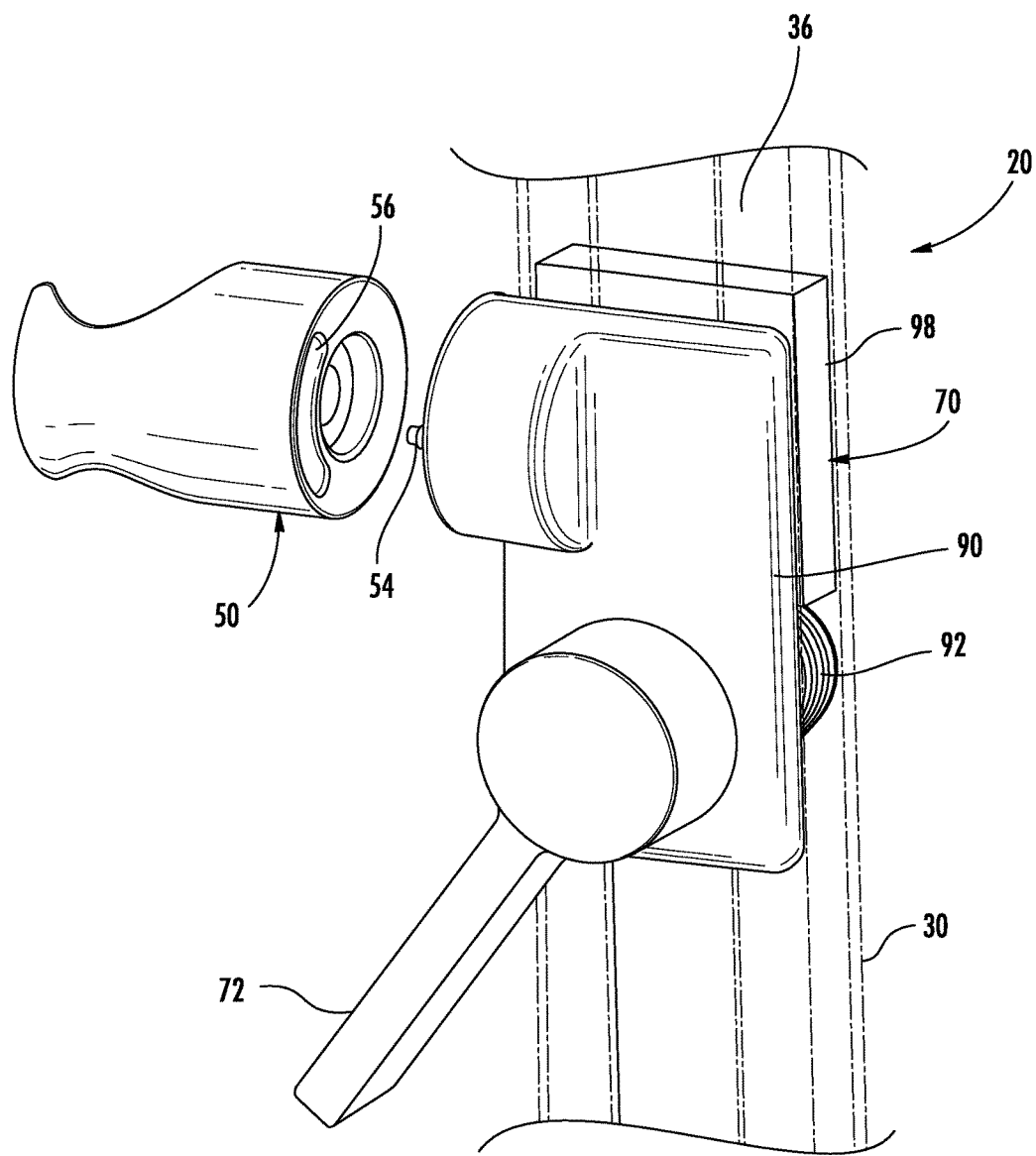
FIG. 12 is a partially exploded and partial breakaway perspective view of the handshower slide of FIG. 1.

The angle of the handshower holder 50 (and therefore the angle of the handshower water spray) may be adjusted relative to the slide mechanism 70 and the bar 30 with a tilting mechanism, according to the desired configuration. For example, as the slide mechanism 70 moves along the bar 30, the desired angle of water spray may change. As shown in FIGS. 2, 11, and 12, the handshower holder 50 may be rotatably attached to the slide mechanism 70, and, more specifically, to the base 90. The handshower holder 50 may be rotated forward and backward (or up and down) with respect to the bar 30 and/or the slide mechanism 70 in order to change the angle of the spray of water. For example, as shown in FIG. 2, the handshower holder 50 may be rotated in either direction, as shown by arrows 52.

According to one embodiment, the handshower holder 50 may not require any knob or handle to be tightened or loosened in order to move or secure the handshower holder 50. Instead, the handshower holder 50 may be directly moved by the user to the desired angle. Due to internal tension in the handshower holder 50, the handshower holder 50 may independently or automatically maintain or secure the position the user has moved the handshower holder 50 to with respect to the base 90. As shown in FIGS. 6 and 12, a peg or pin 54 may be attached to or anchored within the base 90 and movably inserted or locked into a groove or slot 56 in the handshower holder 50. The pin 54 may move within the slot 56 as the handshower holder 50 is rotated with respect to the base 90. Alternatively, the pin 54 may be attached to the base 90 and the handshower holder may include a slot 56. The slot 56 may limit the degree of rotational travel or range of motion to a desired range in either direction by providing a stop on either end of the slot 56 for the pin 54 hit in order to prevent further rotation. For example, the slot may allow for 30-40° of rotation. The pin 54 may be a variety of components, such as a set screw extending out of either the handshower holder 50 or the base 90. According to another embodiment, the travel limiting feature may be accomplished with the pin anchored in handshower holder 50 and inserted into a corresponding slot in the base 90.

The handshower holder 50 may be secured to the base 90 through a variety of different mechanisms, including a screw 58, as shown in FIG. 6. The screw 58 may be inserted through the center of the slide mechanism 70 and into the base 90. To prevent metal-on-metal rubbing and squeaking, a bearing 59 may be inserted between the screw 58 and the handshower holder 50. The bearing 59 may rotate around the screw 58 as the handshower holder 50 is rotated. The bearing 59 may be, for example, round or c-shaped, according to the desired configuration. The bearing 59 may further be constructed with a variety of materials, including but not limited to a hard plastic, such as acetal. Additional components or features, such as a glue or Loctite, may be used to help keep the screw 58 in place over time.

In order to provide sufficient tension within the handshower holder 50 to maintain the desired angle and to fix or hold the handshower holder 50 in position, a spring 62 may be inserted between the handshower holder 50 and the base 90. The spring 62 may optionally be surrounded by washers 64. The washers 64 may be a variety of materials, including but not limited to acetal. The screw 58 may be inserted through the spring 62 and the washers 64 and tightened to the desired torque value, according to the desired resistance required to move the handshower holder 50. As the screw 58 draws the handshower holder 50 toward the base 90, the spring 62 is at least partially compressed or squeezed. Therefore, the spring 62 provides an opposite axial force against the force of the screw 58, pushing the handshower holder 50 and the base 90 apart, thereby resulting in an internal tension to maintain the position of the handshower holder 50 and preventing the handshower holder 50 from inadvertently tilting or rotating freely.

Figures 13A, 13B:
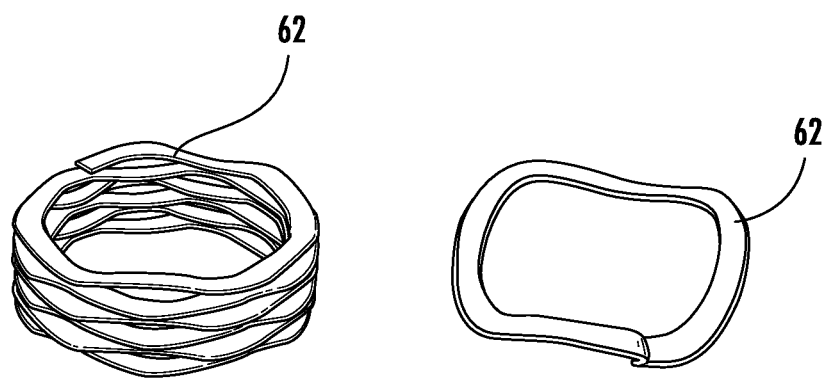
FIGS. 13A and 13B are perspective views of springs that may be disposed within the handshower holder on the handshower slide of FIG. 1.

A variety of different springs 62 may be used, wherein the spring 62 provides an opposite outward force when compressed. For example, as shown in FIGS. 13A and 13B, a wave spring or washer may be used. As shown in FIG. 13A, a "crest-to-crest" wave spring may be used or, as shown in FIG. 13B, a "single turn" wave spring may be used, according to the desired thickness and outward exerted force. Alternatively, a cupped spring, as shown in FIG. 6, or a spring washer may be used. As the spring 62 is flattened, the spring 62 exerts an axial force to expand back to its original configuration. Depending on the type and configuration of the spring 62, the spring 62 may be configured to provide a large amount of outward force while having a relatively small height or length. The spring 62 may be constructed out of a variety of materials, including but not limited to stainless steel.

The tilting mechanism of the handshower holder 50 may be used in conjunction with or separately from the slide mechanism 70. For example, the handshower holder 50 may be directly mounted to the shower wall and have an adjustable angle, while not movable in the vertical direction. Alternatively, the slide mechanism 70 may be used separately from the tilting mechanism of the handshower holder 50. For example, the handshower holder 50 may be moved vertically along the bar 30 without changing the tilt or angle of the handshower holder 50 or including a mechanism to change the tilt or angle.

In order to manufacture or assemble the handshower slide 20, the spring 82 must be pre-tensioned in the handle 72 and anchored into the base 90 as the slide mechanism 70 is being assembled into the bar 30. The spring wings 84 may hook or lock into the base 90 and the handle 72 in such a way as to pre-tension the spring 82 in order to be biased to move into the locked position 22. In order to move the slide mechanism 70 at least partially into and along the bar 30, the handle 72 must be held in the unlocked position 24 to allow the cam 92 to freely move within the bar 30 and to prevent the cam 92 from locking along the length of the passageway 36. Holding the handle 72 in the unlocked position moves the sides of the cam 92 at least partially separate or detached from the passageway 36 of the bar 30 to allow the slide mechanism 70 to move within the bar 30 and further pre-tensions the spring 82.

Once the slide mechanism 70 is positioned within the bar 30, the handle 72 may be released to allow the slide mechanism 70 to stay in place. The wall posts 32 may subsequently be assembled onto the bar 30 to trap the slide mechanism 70 along the length of the bar 30.

Further certain components must be properly aligned and oriented before inserting the slide mechanism 70 into the bar 30. For example, the relative angles or orientations of the handle 72 and the cam 92 must be preset by correctly aligning the teeth 76 of the handle 72 and the cam 92. More specifically, a certain spline tooth must align with a certain broach notch during the assembly of the handle 72 to the cam 92. The cam 92 may then be screwed into the handle 72 to maintain the relative positioning as the slide mechanism 70 is inserted into the bar 30.

The handshower holder 50 may be assembled or attached onto the slide mechanism 70 before or after the slide mechanism 70 has been attached to the bar 30, according to the desired configuration. In order to assemble the handshower holder 50 onto the slide mechanism before attaching to the bar 30, the relative positioning of the two spring wings 84 and the corresponding crevices 74 and 91 may positioned specifically to prevent the handle 72 from interfering with (or rotating into) the handshower holder 50 during assembly (while the handle 72 is being held in the unlocked position 24). For example, the spring wings 84 may be oriented such that the spring wings 84 are 180° away from each other in order for handshower holder 50 to be installed onto the slide mechanism 70 before the slide mechanism is assembled onto the bar 30.

Figure 14:
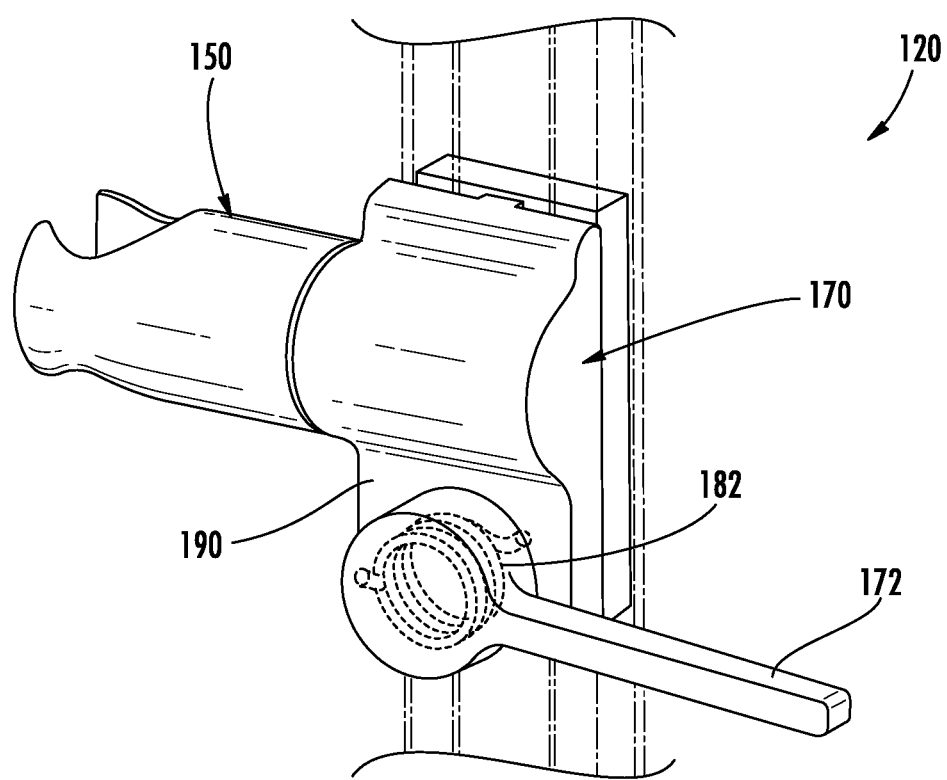
FIG. 14 is a perspective back view of a handshower slide according to one embodiment of the present invention.
Figure 17:
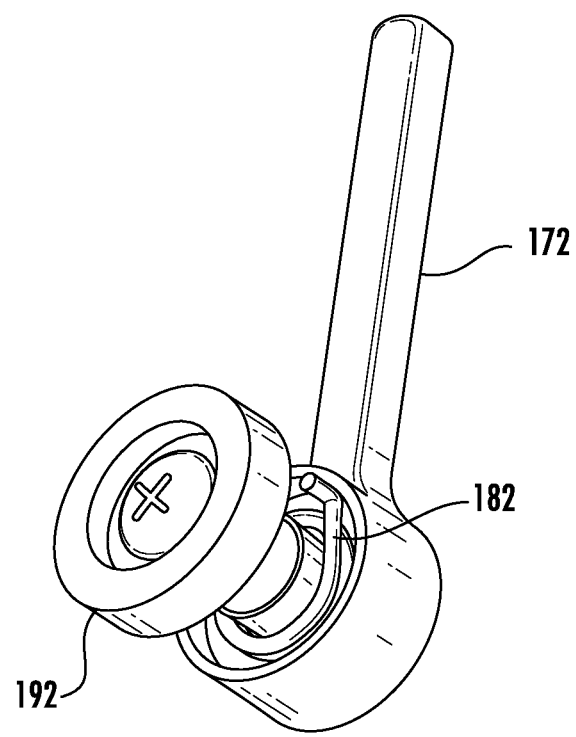
FIG. 17 is a perspective view of a handle, cam, and spring that may be disposed within the handshower slide of FIG. 14.
Figure 18:
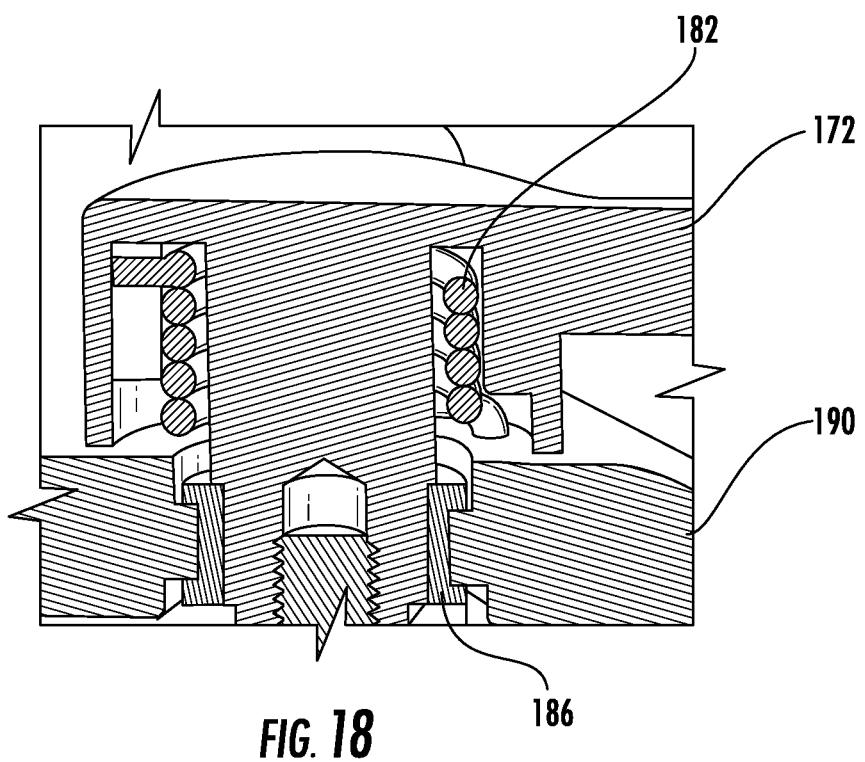
FIG. 18 is a cross-sectional view of the slide mechanism that may be disposed within the handshower slide of FIG. 14.

FIGS. 14-18 depict another embodiment of a handshower slide 120 with a handshower holder 150 and a slide mechanism 170. A handle 172 may be directly or indirectly connected with a cam 192 through a base 190 of the slide mechanism 170. A spring 182 may fit within the handle 172 to couple the handle 172 to the base 190 and to bias the handle 172 (and thereby the cam 192) toward the locked position 22, as described previously. As shown in FIGS. 14 and 15, the spring 182 may be at least partially concealed by the handle 172. As shown in FIG. 18, the spring 182 may lock or latch into the handle 172 and the base 190. A bearing 186 may be positioned between the handle 172 (and/or cam 192) and the base 190 in order to prevent metal-on-metal rubbing, as shown in FIG. 18. The base 190 may support or rotatably hold the handshower holder 150, as described previously.

An inner slide 198 may be coupled to the base 190, either directly or indirectly, and may at least partially move within the bar 30 as the slide mechanism 170 is moved. The inner slide 198 may include wings 199 at least partially extending around either side of the cam 192 within the bar 30. As the cam 192 is rotated into the locked position 22, the sides of the cam 192 press against the wings 199, which causes the wings 199 to at least partially flex outward and transfer the force of the cam 192 to the inside of the bar 30, thereby locking the slide mechanism 170 in place. The wings 199 may further improve the stability and smooth slide feel of the slide mechanism 170 and minimize any undesirable noises or sound (due to, for example, metal-on-metal contact) as the slide mechanism 170 is moved along the bar 30. The wings 199 may be made out of a variety of materials with a different flexibility and stiffness, according to the desired force to be exerted by the cam 192 to the inside of the bar 30. However, as described previously, the cam 192 may directly interact and engage with the inside of the bar 30.

The cam 192 may be a variety of different shapes according to the desired configuration and degree of grip and depending on the shapes and materials of the surrounding components, such as the bar 30 and the inner slide 198. For example, the cam 192 may be relatively more circular (compared to cam 92), as shown in FIG. 17. The cam 192 may or may not include additional frictional components, such as the O-rings 94, depending on the surrounding material and the material of the cam 192 itself. For example, the wings 199 or the passageway 36 of the bar 30 may include additional frictional components or materials to engage with the cam 192.

The embodiments disclosed herein allow a showerhead to be movably and automatically secured along a bar. Besides those embodiments depicted in the figures and described in the above description, other embodiments of the present invention are also contemplated. For example, any single feature of one embodiment of the present invention may be used in any other embodiment of the present invention.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. An adjustable showerhead slide comprising:
a bar with a passageway;
a slide mechanism positioned along a length of the passageway and at least partially within the passageway,
wherein the slide mechanism comprises a handle; and
a showerhead holder movable with the slide mechanism along the length of the passageway,
wherein the handle is rotatable to move the slide mechanism between a locked configuration and an unlocked configuration, wherein the slide mechanism is not movable along the length of the passageway in the locked configuration and is movable along the length of the passageway in the unlocked configuration, wherein the slide mechanism is biased toward the locked configuration.

2. The adjustable showerhead slide of claim 1, wherein the slide mechanism comprises an inner slide positioned at least partially within the passageway of the bar, wherein the handle is rotatably attached to the inner slide, wherein an orientation of the handle controls whether the slide mechanism is in the unlocked configuration or the locked configuration, and wherein, when the handle is released, the slide mechanism automatically moves into the locked configuration.

3. An adjustable showerhead slide comprising:
a bar with a passageway;
a slide mechanism positioned along a length of the passageway and at least partially within the passageway; and
a showerhead holder movable with the slide mechanism along the length of the passageway,
wherein the slide mechanism is not movable along the length of the passageway in a locked configuration and is movable along the length of the passageway in an unlocked configuration, wherein the slide mechanism is biased toward the locked configuration,
wherein the slide mechanism comprises a cam that is positioned within the passageway and is rotatable between a first orientation and a second orientation relative to the bar, wherein the slide mechanism is in the locked configuration while the cam is in the first orientation and is in the unlocked configuration while the cam is in the second orientation.

4. The adjustable showerhead slide of claim 3, wherein the slide mechanism includes an inner slide positioned at least partially within the passageway, wherein the inner slide includes an arc at one end that at least a portion of the cam can rotate within.

5. The adjustable showerhead slide of claim 1, wherein the showerhead holder is configured to hold a shower head and is rotatably attached to the slide mechanism, further comprising a securing mechanism configured to automatically secure the showerhead holder in any radial position relative to the slide mechanism.

6. The adjustable showerhead slide of claim 5, further comprising an adjustment mechanism configured to allow the angle of the showerhead holder to be rotatably adjusted relative to the slide mechanism, wherein an angle of a spray of water of the shower head is dependent on an angle of the holder relative to the support, wherein the adjustment mechanism includes one of a slot or a pin that interacts with the other of the slot and the pin on the slide mechanism such that the pin is movable within the slot as the showerhead holder rotates relative to the slide mechanism, wherein a range of rotation of the showerhead holder relative to the slide mechanism is determined by an arc length of the slot.

7. An adjustable showerhead slide comprising:
a bar;
a slide mechanism positioned along a length of the bar; and
a showerhead holder movable with the slide mechanism along the length of the bar,
wherein the slide mechanism comprises a cam that is rotatable between a first orientation and a second orientation relative to the bar, wherein the cam is engaged with the bar in the first orientation,
wherein the slide mechanism is not movable along the length of the bar while the cam is in the first orientation and is movable along the length of the bar while the cam is in the second orientation.

8. The adjustable showerhead slide of claim 7, wherein the slide mechanism further comprises a handle, wherein an orientation of the cam is correlated to a position of the handle, wherein rotating the handle increases or decreases a force exerted by the cam to the bar.

9. An adjustable showerhead slide comprising:
a bar;
a slide mechanism positioned along a length of the bar; and
a showerhead holder movable with the slide mechanism along the length of the bar,
wherein the slide mechanism comprises a cam that is rotatable between a first orientation and a second orientation relative to the bar,
wherein the slide mechanism is not movable along the length of the bar while the cam is in the first orientation and is movable along the length of the bar while the cam is in the second orientation,
wherein the bar includes a passageway, wherein the cam of the slide mechanism is positioned within the passageway.

10. The adjustable showerhead slide of claim 7, wherein the slide mechanism is not movable along the length of the bar in a locked configuration and is movable along the length of the bar in an unlocked configuration, wherein the slide mechanism is biased toward the locked configuration.

11. The adjustable showerhead slide of claim 7, wherein the cam secures the slide mechanism along the length of the bar with at least one of a frictional force or a magnetic force.

12. The adjustable showerhead slide of claim 7, wherein a cross-sectional shape of the cam is an oblong shape.

13. The adjustable showerhead slide of claim 7, wherein the showerhead holder is configured to hold a shower head and is rotatably attached to the slide mechanism, further comprising a securing mechanism configured to automatically secure the showerhead holder in any radial position relative to the slide mechanism.

14. The adjustable showerhead slide of claim 13, further comprising an adjustment mechanism configured to allow the angle of the showerhead holder to be rotatably adjusted relative to the slide mechanism, wherein an angle of a spray of water of the shower head is dependent on an angle of the holder relative to the support, wherein the adjustment mechanism includes one of a slot or a pin that interacts with the other of the slot and the pin on the slide mechanism such that the pin is movable within the slot as the showerhead holder rotates relative to the slide mechanism, wherein a range of rotation of the showerhead holder relative to the slide mechanism is determined by an arc length of the slot.

15. A showerhead holder assembly comprising:
a holder configured to hold a shower head,
wherein the holder is rotatably attached to a support;
an adjustment mechanism configured to allow the angle of the holder to be rotatably adjusted relative to the support; and
a securing mechanism configured to automatically secure the holder in any radial position relative to the support,
wherein an angle of a spray of water of the shower head is dependent on an angle of the holder relative to the support,
wherein the adjustment mechanism includes one of a slot or a pin that interacts with the other of the slot and the pin on the support such that the pin is movable within the slot as the holder rotates relative to the support, wherein a range of rotation of the holder relative to the support is determined by an arc length of the slot,
wherein the support is positioned along a length of a passageway of a bar.

16. The showerhead holder of claim 15, wherein the pin is slidable along the arc length of the slot.

17. The showerhead holder of claim 15, wherein the slot includes a first stop on a first end of the slot and a second stop on a second end of the slot that is opposite the first end, wherein the arc length of the slot is the distance along the slot between the first stop and the second stop, wherein the first stop and the second stop prevent further rotation of the holder, wherein the pin abuts the first stop in a first position and abuts the second stop in a second position.

18. The showerhead holder assembly claim 15, wherein the securing mechanism includes a spring between the holder and the support, wherein the spring is configured to prevent the holder from rotating freely relative to the support.

19. The showerhead holder assembly of claim 15, wherein the holder is movable with the support along the length of the passageway, wherein the support is not movable along the length of the passageway in a locked configuration and is movable along the length of the passageway in an unlocked configuration, wherein the support is biased toward the locked configuration.

20. The showerhead holder assembly of claim 15, wherein the support is positioned along a length of a bar, wherein the holder is movable with the support along the length of the bar, wherein the support comprises a cam that is rotatable between a first orientation and a second orientation relative to the bar, wherein the support is not movable along the length of the bar while the cam is in the first orientation and is movable along the length of the bar while the cam is in the second orientation.

21. The adjustable showerhead slide of claim 7, wherein the cam is not engaged with the bar in the second orientation.

* * * * *